United States Patent [19]

Heidemann

[11] Patent Number: 5,251,053

[45] Date of Patent: Oct. 5, 1993

[54] RADIO COMMUNICATION SYSTEM

[75] Inventor: Rolf Heidemann, Tamm, Fed. Rep. of Germany

[73] Assignee: Alcatel N.V., Netherlands

[21] Appl. No.: 710,158

[22] Filed: Jun. 4, 1991

[30] Foreign Application Priority Data

Jun. 15, 1990 [DE] Fed. Rep. of Germany ....... 4019224

[51] Int. Cl.$^5$ ..................... H04B 10/00; H04B 10/12
[52] U.S. Cl. .................................. 359/145; 359/157; 359/146; 359/168; 359/173; 359/191; 379/56; 379/58
[58] Field of Search ............... 359/113, 120, 121, 145, 359/146, 172, 173, 154, 152, 178, 181, 182, 191, 157, 168; 379/59, 60, 61, 63, 56, 58

[56] References Cited

U.S. PATENT DOCUMENTS

| | | | |
|---|---|---|---|
| H850 | 11/1990 | Feldman | 359/114 |
| 3,513,433 | 5/1970 | Andersen | 359/167 |
| 3,546,465 | 5/1968 | Arnauld | 357/191 |
| 4,553,101 | 11/1985 | Mathis | 359/121 |
| 4,658,096 | 4/1987 | West, Jr. et al. | 379/59 |
| 4,916,296 | 4/1990 | Streck | 340/904 |
| 4,916,460 | 4/1990 | Powell | 359/172 |

FOREIGN PATENT DOCUMENTS

| | | |
|---|---|---|
| 0287378 | 10/1988 | European Pat. Off. . |
| 240475 | 10/1988 | Fed. Rep. of Germany . |
| 3713340 | 11/1988 | Fed. Rep. of Germany . |
| 0346925 | 6/1989 | United Kingdom ................ 359/145 |

Primary Examiner—Herbert Goldstein
Assistant Examiner—Rafael Bacares
Attorney, Agent, or Firm—Ware, Fressola, Van Der Sluys & Adolphson

[57] ABSTRACT

In a cellular mobile-radio system with radio stations and transmission facilities remote therefrom, the radio stations send out radio signals and receive radio signals which, in each case, contain information signals. According to the invention, as many as possible of the processing functions are shifted from the radio stations to the transmission facilities. The radio signal to be sent out by the radio station is easily generated in the radio station because in the transmission facility, an unmodulated carrier and a carrier modulated with the information signal is produced, in which case the carriers differ in frequency by the amount of the carrier frequency of the radio signal. These two optical carriers are transmitted to the radio station and are mixed there in an optical receiver, so that the radio signal containing the information signal is generated. A radio signal that is received in a radio station is transmitted optically to a the transmission facility and is processed further there. This transmission is carried out by the fact that an optical transmitter present in the transmission facility generates an unmodulated optical carrier and transmits it to an optical modulator located in the radio station. In the optical modulator, the light, modulated with the received radio signals, is sent back and the radio signal is recovered by optical heterodyne reception of the unmodulated and modulated carrier.

8 Claims, 4 Drawing Sheets

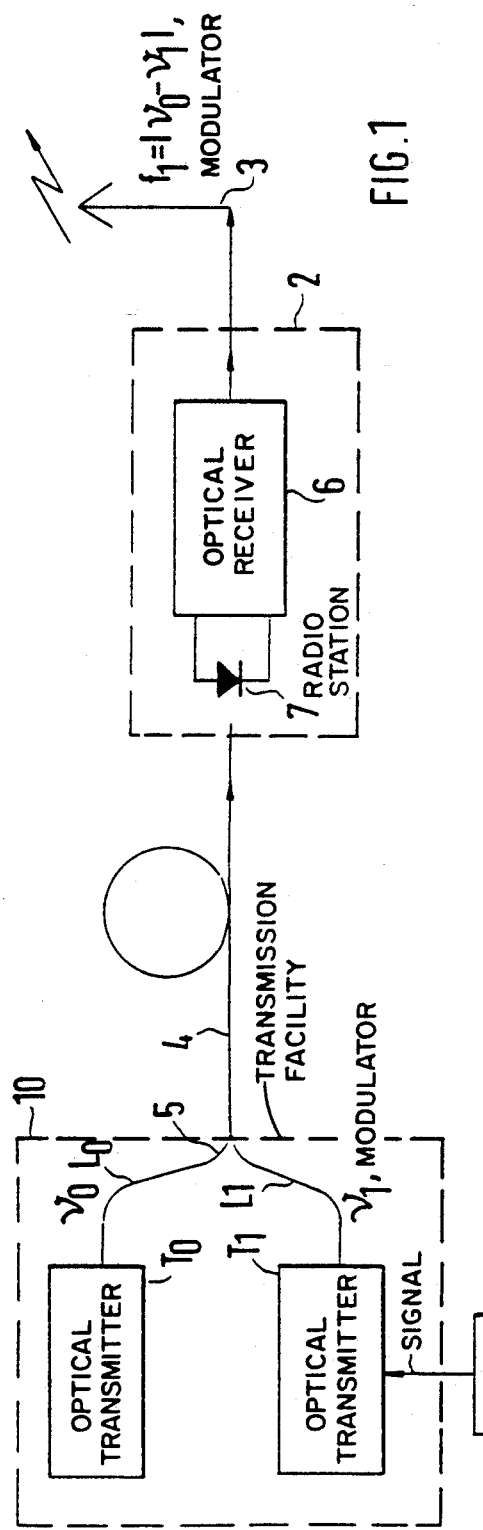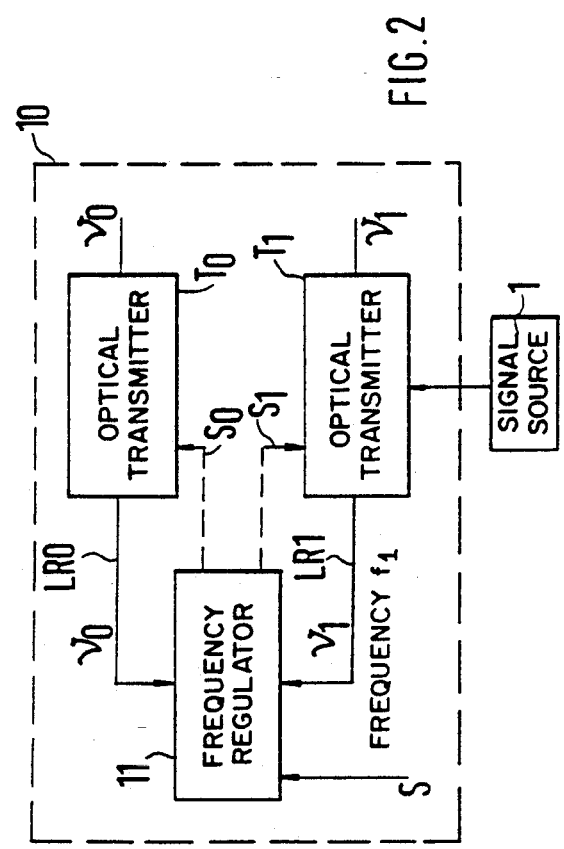

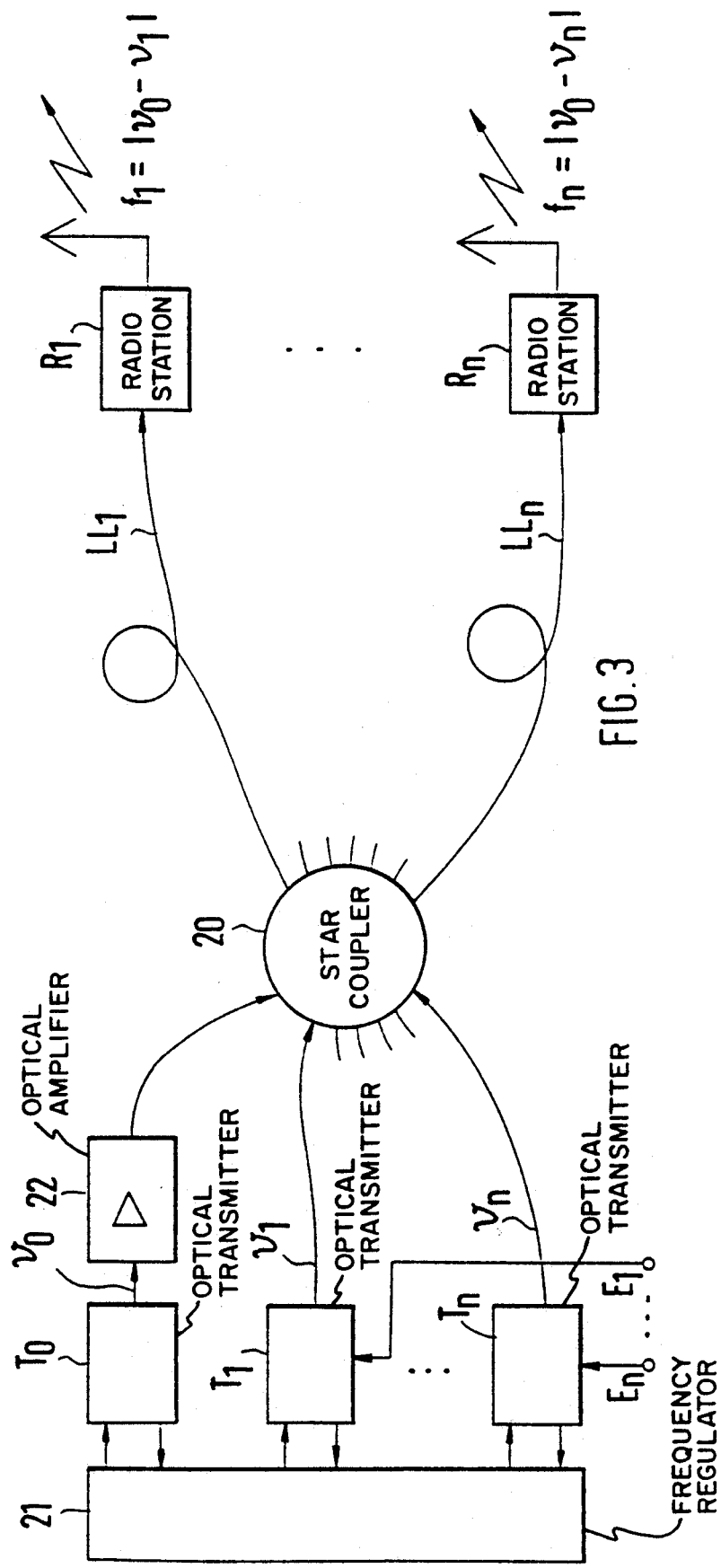

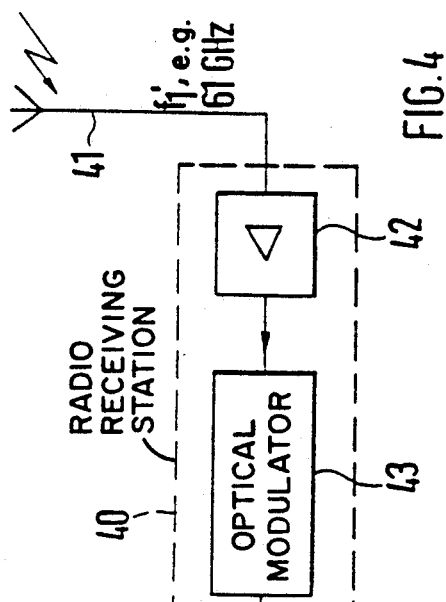
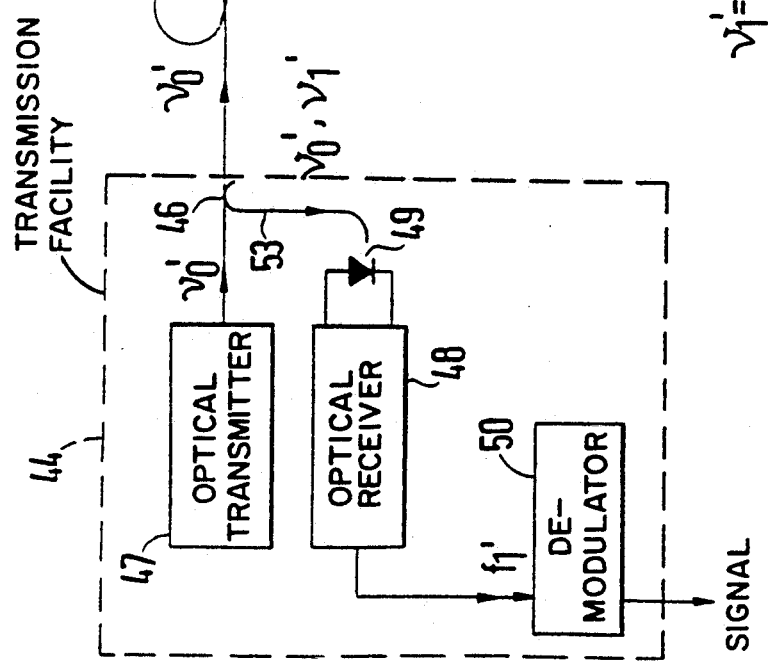

photosensitive field effect transistor photosensitive high-electron-mobility transistor (HEMT)

photosensitive transit-time device (photo-Baritt-diode or photo-Gunn-diode or photo-Impatt-diode)

RADIO COMMUNICATION SYSTEM

BACKGROUND OF THE INVENTION

1. Field of the Invention

The invention relates to communication systems, and more particularly to a cellular mobile-radio system.

2. Description of the Prior Art

A cellular mobile-radio system of this type is known from "ECR900 Cellular Radiotelephone", M. Ballard et al, *Electrical Communication,* Vol. 63, No. 1, 1989, pp. 45-51, or from "Intelligente Netze beschleunigen Einführung neuer Dienste", H. Auspurg, *Telcom Report* 12 (1989), Vol. 5, pp. 142-145. This involves the cellular mobile-radio system standardized throughout Europe as the so-called GSM System.

In this system, the source supplying the information signal that is to be transmitted by the radio station is the so-called "mobile communication switching center", and the radio station distant therefrom in space is the so-called base station. In the information signal source, i.e., in the mobile communication switching center, there is located a transmission facility which is connected by a line with the base station and which transmits the information signal originating from the information signal source to the base station. The base station, more precisely the radio station of the base station, sends out a microwave radio signal which has a specific carrier frequency and which contains the information signal.

In the known systems, the information signal is transmitted from the information signal source to the base station in the base band state, e.g., as a PCM 30 signal. The base station has carrier frequency facilities, which transform the information signal to be sent out from the base band state into the radio signal, so that it can be sent out through the radio connection to the mobile subscribers.

For the radio signal that a base station receives from the mobile subscribers, the base station in the known systems has RF demodulation facilities, generally also called RF carrier frequency facilities. These facilities recover from the received radio signal the information signal contained therein, e.g., a digital signal with a bit sequence frequency of approximately 8 Mbit/s, which is then transmitted in the base band state to the mobile communication switching center.

If the radio traffic to be carried out is so dense that the cells supplied by each base station are appropriately selected to be very small, i.e., a transition to so-called "microcells" is made, then this requires a very large number of cells and, thus, a very large number of base stations in order to supply a specific geographic region. If the known system is used as a basis for this, this means high costs, because a very large number of base stations must be present, and each of these is expensive primarily because of its RF carrier frequency facilities.

SUMMARY OF THE INVENTION

It is therefore the object of the invention to provide a system of the type mentioned above, in which the radio signal to be sent out by a base station is generated in such a way and the radio signal to be received by a base station is further processed in such way that, with a plurality of cells present, it offers cost advantages over the known system and is particularly suitable for radio-frequency radio signals in the range of millimeter wavelengths.

The problem is solved with respect to the radio signal to be transmitted and with respect to a received radio signal. In regard to the transmitted signal, the system includes a transmission facility provided with means for receiving an information signal from an information-signal source, a distant radio station, and an optical waveguide connecting the transmission facility to the radio station for carrying an information signal to the radio station, and wherein the radio station sends out a radio signal containing the information signal and having a carrier frequency $f_1$, the transmission facility transmits to the radio station an optical carrier wave modulated with the information signal and having a first optical frequency and an unmodulated optical carrier wave having a second optical frequency, with the two optical frequencies differing by the value of the carrier frequency $f_1$, and the radio station includes a device which generates the radio signal containing the information signal and having the carrier frequency $f_1$ by mixing the two carrier waves.

In regard to the received signal, the system includes a radio receiving station which receives a radio signal containing an information signal, a transmission facility distant from the radio receiving station in terms of space, and at least one optical waveguide connecting the radio receiving station to the transmission facility, the transmission facility includes an optical transmitter which transmits an unmodulated optical carrier wave to the radio station, the radio station includes an optical modulator which modulates the optical carrier wave transmitted by the transmission facility with the received radio signal and sends the optical signal resulting from the modulation back to the transmission facility, and the transmission facility includes an optical receiver which recovers the radio signal by mixing the unmodulated carrier wave with the modulated carrier wave.

For cellular mobile-radio systems, in which various information signals are to be transmitted from a central location to various radio stations and vice versa, the invention has the advantage that the radio stations are extremely simple and that all classical transmission facilities are located in the central location and can therefore be used jointly for a plurality of radio stations.

Also for other radio communication systems in which only a single information signal is to be transmitted from a specific location to the radio station, e.g., a radio relay station, and vice versa, the invention has the advantage that the radio station, e.g., the radio relay station, is an extremely simple and inexpensive technical facility and that the more expensive transmission facilities are located at a location that is possibly more easily accessible than the radio relay station and can be protected more easily against destruction.

Aside from the use in a cellular mobile-radio system that is presented as a preferred use, the solution can be used in any cases in which an information signal is located at a first location and a signal containing the information signal through modulation, particularly a radio frequency signal, must be generated at a second location. Accordingly, the solution can be used in any cases in which a signal, particularly a radio-frequency signal, must be transmitted from a first location to a second location without requiring expensive facilities at the first location.

The information is based on the basic idea of shifting the expense required for the generation of the radio signal to be sent out, and for the processing of the received radio signal as far as possible from the radio station to the switching center. This has already been the object of the older German Patent Application DE-A1 40 08 165 corresponding to U.S. patent application Ser. No. 07/647,291, filed Jan. 29, 1991.

The present invention, both in the transmitting and receiving facilities, uses the known technique of optical heterodyne reception which has been described many times, for example, in "Optischer Überlagerungsempfang—eine Übersicht", V. O. Strobel et al, *FREQUENZ*, Vol. 41 (1987) No. 8, pp. 201-208.

In the transmitting facility it can be stated that this involves a system with optical heterodyne reception, with the special feature that the intermediate frequency signal generated by the heterodyne reception is not the received signal to be demodulated, but the radio signal to be sent out and that the "local oscillator" typical for heterodyne reception is located not at the receiver but at the transmitter. In the receiving facility it can be stated that this involves a system with optical heterodyne reception, with the special feature that the "transmitting oscillator" and the "local oscillator" are realized by means of a single oscillator (optical transmitter).

DESCRIPTION OF THE DRAWINGS

The invention will now be explained in greater detail by examples according to the drawings, in which:

FIG. 1 is a schematic representation of a system according to the invention for the transmission of an information signal to be sent out as a radio signal.

FIG. 2 is a more detailed representation of the transmission facility 10 of FIG. 1.

FIG. 3 is a schematic representation of a system according to the invention for the transmission of a plurality of information signals to be sent out as radio signals.

FIG. 4 is a schematic representation of a system for the transmission of a received radio signal containing an information signal.

FIG. 5 is an alternative to the optical modulator 43 contained in FIG. 4.

DETAILED DESCRIPTION OF THE INVENTION

Figure 6A:
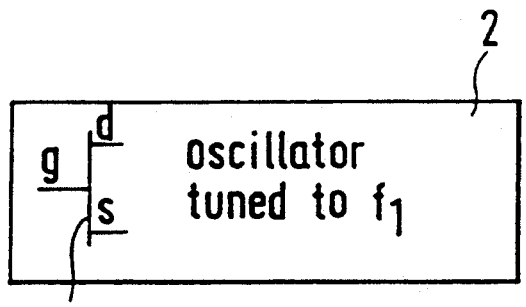
FIGS. 6A, 6B and 6C show different variants for the optical receiver of FIG. 1.

The system according to the invention has a transmission facility which, like the known system mentioned initially, has at a first location an information signal source 1, which supplies an information signal to be transmitted, for example, a digital signal with a bit sequence frequency of approximately 8 Mbit/s. This can be, for example, the switching center of the initially mentioned known cellular mobile-radio system. At a second location, which is remote in space from the location of the information signal source 1, there is located a radio station 2 which, as in the known system, has the task of sending out a radio signal containing the information signal originating from the source 1, by being modulated with this.

The radio station 2 can be one of the many base stations of a cellular mobile-radio system, which has the task of sending out the information signal to the mobile subscribers located in its radio range, the so-called cell, or it can be a radio relay station, which serves to send out the information signal to another, far distant radio relay station.

Shown as belonging to the radio station 2 is a transmission antenna 3 which sends out the radio signal, whose carrier frequency is designated by $f_1$ in the example. At the location of the information signal source 1 there is a transmission facility 10 which, according to the invention, is connected with the remote radio station 2 by means of an optical waveguide 4. The transmission of the information signal from its source 1 to the radio station 2 is carried out as follows:

The information signal modulates one of the optical transmitters $T_1$ belonging to the transmission facility 10, which contains a semiconductor laser as a light source, in such a way that this emits a modulated carrier wave with a specific optical frequency $\nu_1$ at its output. A second optical transmitter $T_0$ generates an unmodulated optical carrier wave with an optical frequency $\nu_0$. The frequencies $\nu_0$ and $\nu_1$ are selected in such a way that they differ by precisely the amount $f_1$ that the radio signal to be sent out by the radio station 2 is to have. For simplification, the carrier waves will be referred to as "carriers" in the following text.

The frequency regulator required for maintaining assigned frequency difference is omitted in FIG. 1. It is explained with reference to FIG. 2. From the outputs of the optical transmitters $T_1$ and $T_0$, the modulated carrier with the optical frequency $\nu_1$ and the unmodulated carrier with the optical frequency $\nu_0$ are each coupled by means of an optical waveguide $L_1$ and $L_0$ respectively, and an optical waveguide coupler 5 into the optical waveguide 4 and are transmitted by this to the remote radio station.

There the light transmitted from the various light sources strikes an optical receiver 6, whose photodiode 7 is shown separately. According to the known technique of optical heterodyne reception, the mixing of the two light signals produces an electrical signal, which contains a component with a frequency that is equal to the difference of the frequencies of the overlaid light signals and that corresponds to the intermediate frequency signal in the classical optical heterodyne reception. This signal contains the same modulation as the optical output signal of the optical transmitter $T_1$ of the transmission facility 10, which can be one of the types of modulation customary in the technique of optical heterodyne reception. The optical receiver contains a suitable selective element for selection of the signal component with the frequency $f_1$ from the signal produced by the mixing. This element can be either a frequency-selective amplifier or a filter tuned to $f_1$ followed by an amplifier.

As in any system with optical heterodyne reception, care must also be taken in the system described above to make sure that the polarization states of the carrier waves to be overlaid are not orthogonal to each other. Aside from the expensive solution of using polarization-maintaining optical waveguides, the known processes of polarization diversity reception or of polarization control can be used for this purpose. It appears particularly favorable to continuously change the polarization of the light given off by one or both optical transmitters with time (polarization scrambling), so that, viewed statistically, the undesired relative polarization states of orthogonality are sufficiently improbable.

The optical waveguide 4 can be a standard monomode optical waveguide and, with respect to the optical transmitters and optical receivers, the requirements to be made are no higher than for any systems operating with optical heterodyne reception.

The two optical carrier waves can, of course, also be transmitted to the optical receiver by means of different optical waveguides. In the optical waveguide 4, the mixing described for the optical receiver does not take place, because, in contrast to the photodiode 7, it has linear optical properties.

A significant advantage of the system described lies in the fact that the optical carrier with the carrier frequency $\nu_1$ is modulated with a signal in a base band state, i.e., a signal with a comparatively very narrow bandwidth. A modulation of this type can be easily carried out with conventional laser diodes. If necessary, an optical amplifier can be inserted with particular advantage at a suitable point into the optical waveguide 4, and this will amplify the two carrier waves in a completely problem-free manner, because it has a large bandwidth of 3000 GHz.

The following numerical example is intended to explain the mode of action of the system according to the invention even more clearly:

If a carrier frequency of 60 GHz is provided for the radio signal to be sent out by the radio station, which corresponds to a wavelength of 5 mm, a typical wavelength from the millimeter wave region, then the carrier frequency $\nu_0$ can be selected as 200,000 GHz and the carrier frequency $\nu_1$ as 200,060 GHz. The two carrier waves then correspond to vacuum wavelengths in the range of 1500 nm. For radio signals as in the selected example, which are in the wavelength range of millimeter waves, there are very favorable and constant propagation conditions in the atmosphere for short radio sections, such as are provided in the case of a cellular mobile-radio system with very small cells. Carrier frequencies of this type can therefore be used advantageously for such a system, and the transmission system according to the invention with heterodyne reception is particularly suitable for these, because it would be difficult to transmit a 60 GHz signal by means of direct laser modulation over an optical transmission section or by means of a different transmission medium.

The frequency control for the optical transmitters $T_0$ and $T_1$ of the transmission facility 10 is described with reference to FIG. 2. From the optical transmitter $T_0$, light with the optical frequency $\nu_0$ passes through an optical waveguide connection $LR_0$ to an optical input of a frequency regulator 11. From the optical transmitter $T_1$, light with the optical carrier frequency $\nu_1$, modulated by the information signal, arrives at a different optical input of the frequency regulator 11. The light inputted via the optical waveguide $LR_0$ or $LR_1$ into the frequency regulator 11 can be either the back light of the laser contained in the optical transmitter or a portion of light branched off from the light sent out in the forward direction. The frequency regulator 11 is an optical receiver which, by overlay of the two light signals, generates an optical signal with the differential frequency amounting to $f_1 = |\nu_0 - \nu_1|$, and a filter connected in series with the optical receiver, which is tuned to the scheduled frequency $f_1$ and which emits a control signal to one or the other optical transmitter or to both, if the frequency difference does not coincide with the scheduled frequency $f_1$. The control signals pass through control lines $S_0$ and $S_1$ to the particular optical transmitter and influence its optical frequency in such a way that the frequency difference is regulated to the scheduled value. The modulation contained in the light signal with the carrier frequency $\nu_1$ can be suppressed in the frequency regulation by simple lowpass filtering of the signal formed during the mixing. To preset the scheduled frequency $F_1$, a control signal S is inputted into the frequency regulator 11. Devices for the regulation of optical signals are known in themselves, e.g., from German DE-A1 39 07 851.

A transmission system with which a plurality of information signals is transmitted to a plurality of radio stations will now be explained with reference to FIG. 3. Because, in the system according to FIG. 3, not only an information signal as in the system according to FIG. 1 is to be transmitted, in addition to the optical transmitter $T_0$ generating the optical carrier wave with the carrier frequency $\nu_0$ there is not only another optical transmitter $T_1$ which supplies the carrier wave of the carrier frequency $\nu_1$ modulated with the information signal, but additional optical transmitters, which are numbered continuously up to $T_n$. Of a total of n information signals from sources $E_1$ through $E_n$ each one modulates one of the optical transmitters $T_1$ through $T_n$ which generate carrier waves with different optical frequencies $\nu_1$ through $\nu_n$. All of the optical carriers generated by the optical transmitters, the unmodulated carrier with the optical frequency $\nu_0$ and the modulated carriers with the frequencies $\nu_1$ through $\nu_n$ are each transmitted by an optical waveguide to a star coupler 20, which is connected by individual optical waveguides $LL_1$ through $LL_n$, with radio stations $R_1$ through $R_n$. For the radio stations $R_1$ through $R_n$, various carrier frequencies of the radio signals to be sent out are provided, which are designated by $f_1$ through $f_n$, e.g., $f_1 = 60$ GHz, $f_2 = 61$ GHz, etc.

At the location of the optical transmitters $T_0$ through $T_n$, there is located a frequency regulator 21 which, in accordance with the frequency regulation described with reference to FIG. 2, ensures that each of the carrier frequencies of the optical carriers differs from the carrier frequency $\nu_0$, which is to be viewed as a reference frequency, by an amount equal to the frequency of the assigned radio station. For $i = 1$ through n, we therefore have: $f_i = |\nu_0 - \nu_i|$. In this way, all optical carriers with the frequencies $\nu_0$ through $\nu_n$ are transmitted from each of the optical waveguides $LL_1$ through $LL_n$.

In each of the radio stations $R_1$ through $R_n$, as is described for the radio station 2 from FIG. 1 with reference to the mixing of the two carriers with the frequencies $\nu_0$ and $\nu_1$, a mixing of all carriers takes place, so that optical signals with all possible differential frequencies $|\nu_i - \nu_j|$ are formed. Because, however, each optical receiver $R_1$ has the property of transmitting only the optical signal with the frequency $f_i = |\nu_0 - \nu_i|$ and of suppressing the signals with the other frequencies, there appears at the output of each of the optical receivers the radio signal with the desired frequency $f_i$, which (as described with reference to FIG. 1), is modulated with the information signal to be sent out by this radio station.

If necessary, an optical amplifier can be inserted at a suitable point into one of the optical waveguides shown. An amplifier of this type is represented in the example shown, between the output of the optical transmitter $T_0$ and the star coupler 20, and is identified by the reference number 22.

The multi-signal system according to FIG. 3 also has the advantage that the radio stations are extremely simple and cheap, that all devices determining the frequency of a particular radio signal are centralized at a single location, and that components that can be used for the transmission of different signals, particularly the optical transmitter T₀ supplying the unmodulated carrier wave, can be used in common for the transmission of all signals.

There is also the advantage that changes in the course of expansion or in the course of a new cell assignment, e.g., changes in the plan of the radio frequencies, can be carried out centrally and the radio stations can remain unchanged.

Remaining in the radio stations are only the functions connected with the described mixing of the two carrier waves and directly with the sending out of the radio signals generated thereby. In this way, any frequency control, e.g., a control when using a frequency jump procedure, can be managed by means of a central control.

To realize the optical receiver present in a radio station, which has the property of being selective for the electrical signal with the desired frequency $f_i = |v_0 - v_i|$, the following different variants are possible:

The first variant, 9S shown in FIG. 6A, is the one already explained with reference to FIG. 1, in which the received light strikes the photodiode, e.g., photo pin diode of an optical receiver, with which a filter tuned to the desired differential frequency $f_i = |v_0 - v_i|$ and an amplifier or an amplifier selective for this frequency are connected in series.

Figure 6B:
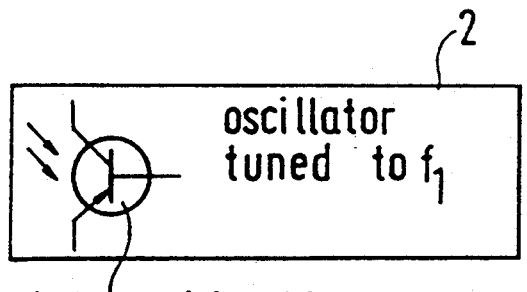

A second variant, 9S as shown in FIG. 6B, provides as an optical receiver an electrical microwave oscillator tuned to the desired differential frequency, which contains a photo-sensitive GaAs field effect transistor or a so-called HEMT (high electron mobility transistor), which is also photo-sensitive. The latter oscillator is also known as a HEMT oscillator. In an oscillator of this type also, a mixing of the two received carriers takes place, with the result that the modulation with the component of the differential frequency contained in the signal formed by mixing is impressed on the oscillator. The oscillator thus represents an optically injection-synchronized oscillator.

Figure 6C:
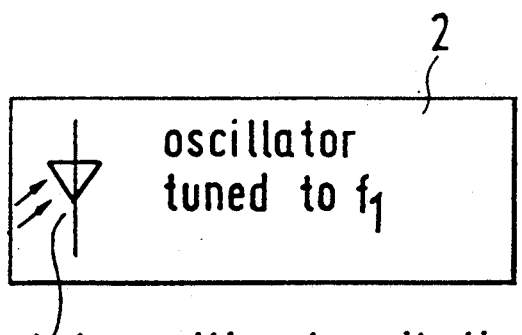

A third variant, 9S as shown in FIG. 6C, is also an optically injection-synchronized oscillator, which is tuned to the desired differential frequency $f_i = |v_0 - v_i|$. This oscillator contains as the photo-sensitive element a photo-Baritt-diode or a photo-Gunn-diode, or a photo-Impatt-diode. This oscillator is also synchronized to the differential frequency $f_i$ between two received optical carriers and therefore delivers at its output the radio signal of the desired frequency $f_i$, modulated with the information signals. It is particularly suitable for frequencies $f_i$ corresponding in their wavelength range to the millimeter waves.

An electrical microwave oscillator with a photosensitive transit-time component is also suitable.

Described below is the signal receiving facility in which a radio signal received by a radio station, which contains an information signal, is to be processed in the radio station and in a transmission facility remote therefrom, so that the information signal is available for further processing in the remote transmission facility. This facility has in common with the transmission facility the basic idea that the largest possible number of transmission and processing devices are to be shifted from the radio station into the remote transmission facility and that the transmission between the radio station and the remote transmission facility is particularly favorable for radio-frequency radio signal in the range of millimeter wavelengths.

FIG. 4 shows a communication system with a radio receiving station 40, whose reception antenna 41 receives a radio signal, which contains an information signal that is modulated onto a carrier with a carrier frequency in the range of millimeter wavelengths, e.g., 61 GHz. The carrier frequency of this radio signal is designated by $f_1'$. The radio receiving station 40 contains a receiver-amplifier 42 which amplifies the received radio signal and applies it to the modulation input of an optical modulator 43.

The communication system has a transmission facility 44 remote in space from the radio station 40. In contrast to the initially-mentioned known mobile radio system, the radio signal received by the radio receiving station 40 is not demodulated in the radio station but is transmitted to the remote transmission facility 44 in the following manner. The transmission facility 44 contains an optical transmitter 47, which generates an optical carrier with an optical frequency $v_0'$. This optical transmitter is connected through an optical waveguide 45, with the optical modulator 43 of the radio receiving station 40, so that the optical carrier is transmitted to the optical modulator with the frequency $v_0'$.

In the example shown, the optical modulator is a reflection modulator, which has the property that it reflects back the light transmitted to it via the optical waveguide 45 and, in this process, modulates it by the signal applied to its modulation input, in this case the radio signal with the carrier frequency $f_1$. In this way, not only the unmodulated carrier with the frequency $v_0'$ is returned to the transmission facility 44 via the optical waveguide 45, but also a modulated carrier with the frequency $v_1' = v_0' \pm f_1'$.

In the transmission facility 44, these two carriers are uncoupled from the optical waveguide 45 by means of a directional coupler 46 and are transmitted via an optical waveguide section 53 to the optical input of an optical receiver 48. In the example shown, the optical receiver has a photo-diode 49 as the photo-sensitive element. The two optical carriers striking the photo-diode of the optical receiver generate there, by the known technique of optical heterodyne reception by mixing an electrical signal which contains a component with a frequency identical to the difference in carrier frequencies of the overlaid carriers and which corresponds to the intermediate frequency signal in classical optical heterodyne reception. In the present case, the intermediate frequency signal has the carrier frequency $f_1'$, i.e., it is the radio signal.

The information signal contained therein is finally recovered by a demodulator 50 and is thus available for further processing or, for example, for transmission via a switching center. In applications other than in mobile radio systems, it is also possible that the demodulator 50 is present not in the transmission facility but elsewhere.

As explained above in connection with the optical receiver 6 of FIG. 1, this must have the property of being selective for the desired frequency. Otherwise, what was stated above for the optical receiver 6 of FIG. 1 applies to the optical receiver in the present case, including the various possible embodiments explained there.

As can be seen from the present explanation, the system is one that can be used generally in any applications where there is the problem of transmitting a signal, particularly a radio-frequency signal, from a location A to a remote location B without expensive transmission facilities for this purpose being present at location A. In the present case, if one considers the output of the reception amplifier 42 as the source of the signal, this is no more than a simple passive optical modulator that must be present at location A. All other devices required for transmission are located at location B. The system is therefore particularly suitable for applications in which location A is inaccessible or where devices present there are in danger of destruction for various reasons.

The system can also be used in connection with radio relay systems, when it is a question of constructing a radio relay station as simply as possible, and of shifting the expensive devices to a remote location. The system is particularly suitable for use in cellular mobile-radio systems for processing of the radio signal received in the base station, since it makes it possible to use the optical transmitter for a plurality of cells in many ways, so that, overall, a low-cost transmission system is available.

A fiber-optic amplifier can be inserted with particular advantage in the optical transmission section between the optical modulator 43 and the transmission facility 44, because it has the property of amplifying light passing through it in both transmission directions. In the example shown, it is appropriately inserted in the optical waveguide 45 in the vicinity of the optical modulator 43, which is omitted in the drawing for the sake of simplicity.

With respect to the polarization states of the overlaid optical carriers, suitable measures must be taken in the system according to FIG. 4, as in that according to FIG. 1.

With reference to FIG. 5, another optical modulator 51 will now be explained, which can be inserted instead of the optical modulator 43 shown in FIG. 1, which is a reflection modulator. The optical modulator 51 is a modulator which modulates the light passing through it with the signal applied to its modulation input. It can therefore be designated as an optical transmission modulator. Modulators of this type are also known in themselves. These are mostly modulators with a lithium-niobate base.

If an optical carrier with the carrier frequency $\nu_0'$ is inserted in this modulator 51, then, as a result of modulation with a modulation signal of the frequency $f_1'$, a carrier with the carrier frequency $\nu_1' = \nu_0' \pm f_1'$ and the original carrier with the frequency $\nu_0'$ are formed. These are coupled from the output of the modulator 51 via an optical waveguide and a directional coupler 52 into the optical waveguide, are transmitted from there to the remote transmission facility 44, and are processed as described above.

In closing, it should also be mentioned that the system according to FIG. 1, in which the information signal is to be transmitted from the transmission facility 10 to the radio station, and the system according to FIG. 4, in which the information signal is to be transmitted from the radio station to the transmission facility 44, can be combined into a bidirectional system. The radio transmission station 2 of FIG. 1 can then be advantageously combined spatially with the radio receiving station 40 from FIG. 4, in which case devices have received multiple uses. A corresponding situation applies to the transmission facility 10 from FIG. 1 and the transmission facility 44 from FIG. 4. Finally, a single optical waveguide in a wavelength multiplex can be used for both transmission directions, by selecting the frequencies in such a way that the frequencies $\nu_0$ and $\nu_1$ (and possibly others) are located in a first wavelength range, e.g., around 1500 nm, and the frequencies $\nu_0'$ and $\nu_1'$ are located in a second wavelength range, e.g., around 1300 nm. For combination and separation of the optical carriers, which are thus separated by a considerable distance, fiber-optic wavelength multiplexers/demultiplexers can then be used in the usual manner.

What is claimed is:

1. A cellular radio communication system, comprising:
    a transmission facility provided with means for receiving an information signal from an information-signal source;
    a distant radio station; and
    an optical waveguide connecting the transmission facility to the radio station for carrying the information signal to the radio station, and wherein the radio station sends out a radio signal in free space containing the information signal and has a carrier frequency $f_1$, the transmission facility transmits on the optical waveguide to the radio station an optical carrier wave modulated with the information signal and having a first optical frequency and an unmodulated optical carrier wave having a second optical frequency, with the two optical frequencies selected to differ by the value of the carrier frequency $f_1$, and the radio station includes a device which generates the radio signal containing the information signal and having the carrier frequency $f_1$ by mixing the modulated and unmodulated optical carrier waves.

2. A system as claimed in claim 1, wherein the transmission facility includes:
    a first optical transmitter which is modulated with the information signal and generates a modulated carrier wave having the first optical frequency by reference to a control signal ($S_1$);
    a second optical transmitter which generates an unmodulated carrier wave having the second optical frequency by reference to a control signal ($S_0$); and
    a frequency regulator which, by reference to a frequency reference signal (S) and the optical carrier waves, provides the control signals ($S_0$, $S_1$) which maintain the first and second optical frequencies at the selected first and second optical frequencies.

3. A system as claimed in claim 1, wherein the device in the radio station is an optical receiver with a photodiode and a means which is selective for the carrier frequency $f_1$.

4. A system as claimed in claim 1, wherein the device in the radio station is an oscillator tuned to the carrier frequency $f_1$ and includes a device selected from the group including a photosensitive field-effect transistor, a photosensitive high-electron-mobility transistor, and a photosensitive transit-time device.

5. A system as claimed in claim 1, wherein to transmit each of a plurality of information signals to one of a plurality of radio stations, a transmission facility provided at information-signal sources generates a plurality of optical carrier waves each modulated with one of the information signals and having different optical frequencies differing from the reference frequency, with each of the optical frequencies differing from the reference frequency by the value of the carrier frequency assigned to one of the radio stations,
    a star coupler and a plurality of optical waveguides are provided which distribute all of the optical carrier waves to the plurality of radio stations, and each of the radio signals generates the radio signal with the carrier frequency assigned to it by mixing the received carrier waves and selective filtering.

6. A communication system, as claimed in claim 1, used to generate from an information signal present at a first location a signal containing the information signal, particularly a radio-frequency signal, at a second location.

7. A system as claimed in claim 2, wherein the device in the radio station is an oscillator tuned to the carrier frequency $f_1$ and includes a device selected from the group including a photosensitive field-effect transistor, a photosensitive high-electron-mobility transistor, and a photosensitive transit-time device.

8. A system as claimed in claim 2, wherein to transmit each of a plurality of information signals to one of a plurality of radio stations, a transmission facility provided at information-signal sources generates a plurality of optical carrier waves each modulated with one of the information signals and having different optical frequencies differing from the reference frequency, with each of the optical frequencies differing from the reference frequency by the value of the carrier frequency assigned to one of the radio stations, a star coupler and a plurality of optical waveguides are provided which distribute all of the optical carrier waves to the plurality of radio stations, and each of the radio stations generates the radio signal with the carrier frequency assigned to it by mixing the received carrier waves and selective filtering.

* * * * *